(12) United States Patent
Lakhotia et al.

(10) Patent No.: US 7,873,947 B1
(45) Date of Patent: Jan. 18, 2011

(54) PHYLOGENY GENERATION

(76) Inventors: Arun Lakhotia, 221 Village La., Lafayette, LA (US) 70506; Md. Enamul Karim, 710 S. College Rd., Apt. 29, Lafayette, LA (US) 70503; Andrew Walenstein, 305 Stephanie Ave., Lafayette, LA (US) 70503

( * ) Notice: Subject to any disclaimer, the term of this patent is extended or adjusted under 35 U.S.C. 154(b) by 1158 days.

(21) Appl. No.: 11/378,913

(22) Filed: Mar. 17, 2006

Related U.S. Application Data

(60) Provisional application No. 60/662,674, filed on Mar. 17, 2005.

(51) Int. Cl.
G06F 9/45 (2006.01)
G06F 9/445 (2006.01)

(52) U.S. Cl. .......................... 717/126; 717/127; 717/149

(58) Field of Classification Search ......... 717/124–131, 717/140–146, 149–151
See application file for complete search history.

(56) References Cited

U.S. PATENT DOCUMENTS

| | | | | |
|---|---|---|---|---|
| 4,729,096 A * | 3/1988 | Larson | ........................ | 717/126 |
| 4,974,191 A * | 11/1990 | Amirghodsi et al. | ........... | 704/8 |
| 5,193,192 A * | 3/1993 | Seberger | ...................... | 717/143 |
| 5,274,818 A * | 12/1993 | Vasilevsky et al. | .......... | 717/149 |
| 5,301,327 A * | 4/1994 | McKeeman et al. | ......... | 717/145 |
| 5,313,387 A * | 5/1994 | McKeeman et al. | ........... | 700/90 |
| 5,325,531 A * | 6/1994 | McKeeman et al. | ......... | 717/145 |
| 5,347,654 A * | 9/1994 | Sabot et al. | ................. | 717/151 |
| 5,430,850 A * | 7/1995 | Papadopoulos et al. | ..... | 719/314 |
| 5,485,626 A * | 1/1996 | Lawlor et al. | ............... | 719/315 |
| 5,522,074 A * | 5/1996 | Endo | ........................... | 717/150 |
| 5,560,029 A * | 9/1996 | Papadopoulos et al. | ........ | 712/25 |
| 5,790,854 A * | 8/1998 | Spielman et al. | ............. | 717/150 |
| 5,867,712 A * | 2/1999 | Shaw et al. | .................. | 717/127 |
| 5,943,670 A * | 8/1999 | Prager | ........................... | 707/5 |
| 5,949,993 A * | 9/1999 | Fritz | ............................ | 703/22 |
| 6,016,395 A * | 1/2000 | Mohamed | .................... | 717/149 |
| 6,029,002 A * | 2/2000 | Afifi et al. | .................... | 717/131 |
| 6,272,257 B1 * | 8/2001 | Prokop | ....................... | 382/246 |
| 6,289,138 B1 * | 9/2001 | Yip et al. | ..................... | 382/307 |
| 6,393,545 B1 * | 5/2002 | Long et al. | .................... | 712/34 |
| 6,550,057 B1 * | 4/2003 | Bowman-Amuah | ......... | 717/126 |
| 6,707,463 B1 * | 3/2004 | Gibson et al. | ................ | 345/619 |
| 6,968,546 B2 * | 11/2005 | Lueh | ........................... | 717/158 |

(Continued)

OTHER PUBLICATIONS

Halperin et al, "Perfect phylogeny and haplotype assignment" ACM RECOMB, pp. 10-19, 2004.*

(Continued)

*Primary Examiner*—Anil Khatri
(74) *Attorney, Agent, or Firm*—Russel O. Primeaux; Kean, Miller, Hawthorne, D'Armond, McCowan & Jarman, LLP

(57) ABSTRACT

A method is provided for comparing malware or other types of computer programs, and for optionally using such a comparison method for (a) searching for matching programs in a collection of programs, (b) classifying programs, and (c) constructing a classification or a partitioning within a collection of programs. In general, there are three steps to the comparison portion: selecting and extracting tokens from a pair of programs for comparison, building features from these tokens, and comparing the programs based on the frequency of feature occurrences to produce a similarity measure. Pairwise similarity is then used for optionally searching, classifying, or constructing classification systems.

14 Claims, 4 Drawing Sheets

Phylogeny model and AV scanner naming cross-reference

U.S. PATENT DOCUMENTS

| | | | | |
|---|---|---|---|---|
| 7,024,661 | B2 * | 4/2006 | Leino et al. | 717/126 |
| 7,152,229 | B2 * | 12/2006 | Chong et al. | 717/146 |
| 7,162,716 | B2 * | 1/2007 | Glanville et al. | 717/151 |
| 7,168,065 | B1 * | 1/2007 | Naccache et al. | 717/127 |
| 7,367,021 | B2 * | 4/2008 | Ansari et al. | 717/151 |
| 7,392,262 | B1 * | 6/2008 | Alspector et al. | 707/102 |
| 7,475,393 | B2 * | 1/2009 | Essick et al. | 717/151 |
| 7,502,728 | B1 * | 3/2009 | Hurlock et al. | 703/23 |
| 7,559,054 | B2 * | 7/2009 | Chang et al. | 717/126 |
| 7,770,162 | B2 * | 8/2010 | Liu et al. | 717/151 |

OTHER PUBLICATIONS

Buneci et al, "Analysis of application heartbeats: Learning structural and temporal features in time series data for identification of performance problem", IEEE, pp. 1-12, 2008.*

Yu et al, "Vector processing as a soft processor accelerator", ACM Trans. on reconfigurable technology and system, vol. 2, No. 2 article 12, pp. 1-34, 2009.*

Crandall et al, "On deriving unknown vulnerabilities from zero day polymorphic and metamorphic worm exploits", ACM CCS, pp. 235-248, 2005.*

* cited by examiner $$P_1 = ABCDefghIJKL \quad \text{and} \quad P_2 = \overline{JIKL}efgh\overline{A}\overline{CB}D$$
Figure 1: Pair of Sequences Related by Swap Modifications
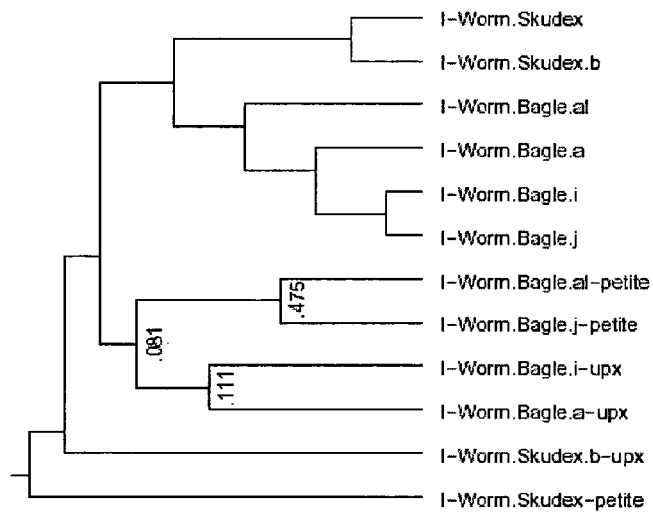
Figure 2: Phylogeny Model Showing Clustering Tendency of Packed Executables

| BYTES | MNEMONIC | |
|---|---|---|
| 8b 51 0c | mov | 0xc(%ecx),%edx |
| 89 f9 | mov | %edi,%ecx |
| 31 d1 | xor | %edx,%ecx |
| 31 f0 | xor | %esi,%eax |
| ba 01 00 00 00 | mov | $0x1,%edx |
| 09 c1 | or | %eax,%ecx |
| 75 d6 | jne | 8049dca <strcpy@plt+0x122> |
| 0f b6 c2 | movzbl | %dl,%eax |

Tokens: mov mov xor xor mov or jne movzbl

⇒4-perm features: {feature1,feature1,feature2,feature3, feature4}

⇒ features frequency matrix: {2, 1,1,1} feature1= mov mov xor xor feature2= xor xor mov or feature3= xor mov or jne feature4=mov or jne movzbl mov mov xor xor

Figure 3: Creation of feature frequency matrix

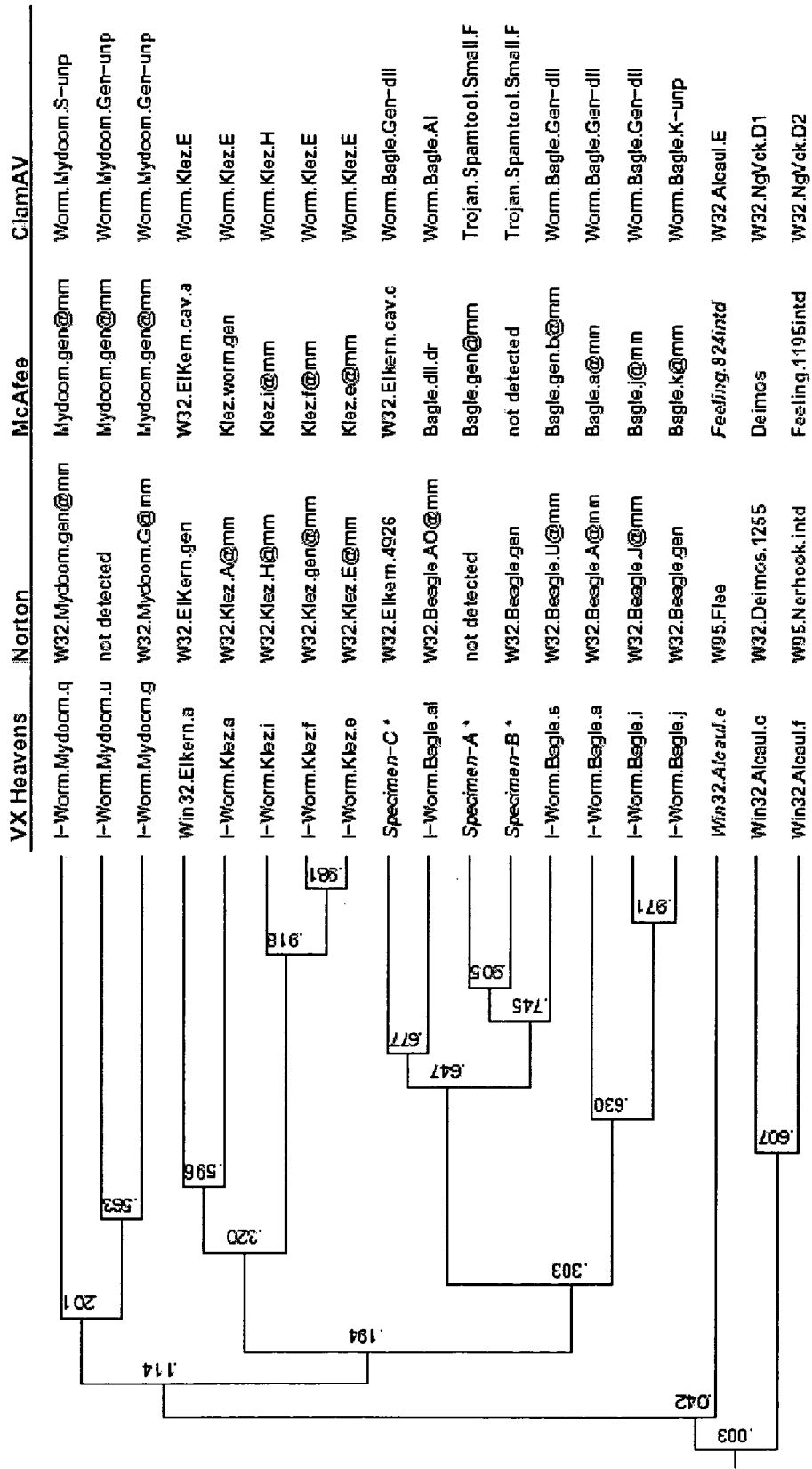
Figure 4: Phylogeny model and AV scanner naming cross-reference

| String | 5-perm | 10-perm | 5-gram | Results for xx_Bagle.r |
|---|---|---|---|---|
| 0.7666 | 0.9671 | 0.8294 | 0.7837 | recent/Bagle-AG |
| 0.7746 | 1.0000 | 1.0000 | 1.0000 | recent/Mydoom-I |
| 0.6709 | 0.9480 | 0.8362 | 0.8080 | recent/Bagle-AG |
| 0.6280 | 0.9731 | 0.8745 | 0.8276 | vx/xx_Bagle.i |
| 0.6280 | 0.9731 | 0.8745 | 0.8276 | recent/Bagle-Gen |
| 0.2761 | 0.4673 | 0.1455 | 0.1133 | recent/Mydoom-M3 |
| 0.2761 | 0.4673 | 0.1455 | 0.1133 | recent/Mydoom-M1 |
| 0.2751 | 0.4715 | 0.1464 | 0.1155 | recent/Mydoom-M |

Figure 5 – One Possible Depiction of Feature Selection and Extraction

PHYLOGENY GENERATION

CROSS REFERENCE TO RELATED APPLICATIONS

This application claims priority to Provisional Application Ser. No. 60/662,674 filed Mar. 17, 2005.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

BACKGROUND OF THE INVENTION

1. Field of the Invention

The present invention relates to comparison, classification and search of executable versions of computer programs. More particularly, the invention relates to comparison, classification and search of executable versions of computer programs, which may include viruses, worms, or other malicious programs.

2. Description of Related Art

The task of measuring the similarity of computer programs is encountered in many program comparison and analysis contexts. Such contexts include, but are not limited to: evaluating the similarity of programs for the purpose of copyright or patent infringement analysis; finding similar programs or program fragments to aid in software development and software assessment; classifying programs as malicious (e.g., as viruses or worms) by comparing them to a database of known malicious or benign programs; creating classification schemes for programs, such as a classification scheme for virus families; and tracking the evolution of programs, such as the evolution of malicious worm code as new variants are released.

There are known techniques for assessing similarity of documents, genomic information, files, and computer programs. Many of the techniques in computer program comparison and genomic comparison work by measuring the similarity of the sequences of characters or tokens. For instance, the standard UNIX utility "diff" can be used to calculate similarity of two files by measuring the differences; "diff" measures difference by finding the longest common subsequence of tokens (text lines, in this case) and then denoting differences in terms of adds, deletions, and changes.

Many of the techniques used for documents work by comparing the frequencies of the terms or features found within the documents. A common feature used, for example, is an "n-gram", which is merely a sequence of n characters or tokens. Given two documents the frequencies of features such as n-grams can be compared and used as a basis of similarity. For instance, the feature frequencies can be interpreted as vectors in a multi-dimensional space.

Techniques for detecting plagiarized and "cloned" parts of programs have also used the above techniques (primarily the sequence-based approaches), as well as methods that compare extracted metrics or extracted structures such as the control-flow graph structures.

Much of the past work specifically for program comparison has worked at the level of source code; fewer work at the level of assembly, bytecode, or machine code. They may need to be adapted for use in this context. One example is a bytecode similarity technique that tokenizes the bytecode and then performs what is termed a p-match algorithm, which serves to match preferably long sequences of tokens. There is a need for improved techniques for comparing programs, particularly for methods that are not overly sensitive to minor ordering changes, and particularly at assembly, bytecode, or machine code level. Moreover, there is a need to make these techniques work in solving problems of search, classification, and phylogeny or classification system construction.

Consider first the phylogeny construction or classification system problem. Software evolves. Frequently the evolution and reuse of code is not recorded. The ancestry and origin of individual portions often cannot be researched. This is true in cases where source code is stolen or plagiarized without permission and without record. It also legitimately happens in large companies and organizations where older legacy software systems are involved. Virus writers rarely record which virus code they have reused, borrowed and modified.

It is often necessary to reconstruct the hereditary relationships between various programs. In biology the relationship graph for species is called the phylogeny. The analogy in software is a software phylogeny. Thus a practical problem encountered frequently is how to find copied but changed code in potentially large bodies of software, and to do so efficiently, and then how to construct models of the phylogenies of the various pieces of software. For instance in software copyright litigation cases it is critical to be able to trace which code was taken from where. In virus defense it is necessary to recognize which viral code has been seen before. There have been attempts to build phylogenies for malwares. In some attempts an n-gram based phylogeny for a collection of computer viruses was developed using a directed acyclic graph whose nodes are the viruses and whose edges map ancestors to descendants and satisfy the property that each code fragment is "invented" only once. These methods assume that if one virus is based on another, long substrings of the ancestor, say 20 bytes or more, will appear in the descendent. In some methods a call flow graph—based similarity approach is developed for clustering malwares.

However, all of the above approaches have shortcomings. One particular sub-problem in this space is doing this for program binaries, bytecodes, or assembly files, i.e., the compiled or executable forms of programs. Virus writers try to hide the phylogeny relationships by several techniques, namely, variable renaming, code encapsulation, code reordering, garbage insertion, and instruction substitution. So, simple n-gram analysis may not detect those twists, e.g., code reordering in the code. Also calls may be obfuscated through instruction substitution making the call flow graph based similarity approach fail in many cases. The remaining difficulty is being able to recognize code that has been changed after it was borrowed, and use these matches to build the true relationship graph between programs.

Similar needs exist for search and classification. Many program search and classification techniques are known. For instance there currently exists a product from Black Duck Software that searches for matching programs on the basis of extracted information. According to their literature, these work on program binaries primarily by matching hash values for the whole binary, rather than matching portions in ways that can account for the possible changes mentioned above for phylogeny generation. One example of program classification technique is to try a variety of classifiers using linking information, ASCII strings or binary n-grams as features upon which the classification is to be made. This technique fails to account for simple variations, such as the different use of registers in two program binaries.

Whether by design or by accident, the prior malware comparison methods have taken approaches that reduce reliance on sequencing information. Methods to compare or align sequences and strings are important tools for molecular phylogenetics. Techniques such as suffix trees, edit distance models, and multiple alignment algorithms are staples for comparing genetic information. These sorts of techniques have been applied to benign computer programs as well, including program texts at the source level, machine level, and in-between. Commercial anti-virus (AV) scanners are also known to use some types of sequence matching in order to classify programs into fine-grained categories (Win32.Evol.A, Win32.Netsky.B, etc.). It is not believed they are substantially similar to suffix trees, edit distances, and the like. Although those methods are known in bioinformatics they appear not to be widely used for the purpose of classification or phylogeny model generation for malware.

On the one hand, sequence-based methods may work well for phylogeny model generation when sufficient numbers of sequences are preserved during evolution. Consider, for instance, the two worms named I-Worm.Lohack.{a,b} (the notation X.{y,z} is a shorthand for the sequence X.y,X.z) which we obtained from VX Heavens, the widely available malware collection. Both worms are 40,960 bytes long and differ on only some 700 bytes (less than 2%). While these two particular programs share large blocks of common bytes, it cannot be assumed that all related malware will. Nonetheless, if, in practice, related malware families maintain sufficient numbers of common sequences then phylogeny models generated based on the sequence commonalities may be satisfactory.

On the other hand, many sequence-based methods may not work well for malware if it has evolved through significant code shuffling and interleaving. Signature-based AV scanners have been known to identify malware by searching for particular sequences. This fact is likely to motivate malware authors to destroy easily identifiable sequences between releases so that they can avoid detection. The ability of AV scanners to detect these sequences is likely to have prompted the emergence of polymorphic and metamorphic malware. Some polymorphic and metamorphic malware—such as Win32.ZPerm and WM/Shuffle.A—permute their code during replication. Recognizing the self-constructed derivatives will be difficult if these permutations are not accounted for. It is reasonable to expect that permutation and reordering will continue to be one of the methods in the malware authors' toolbox.

A common technique in text processing is to use n-grams as features for searching, comparing, and machine learning. An n-gram is simply a string of n characters occurring in sequence. In using n-grams for malware analysis, the programs are broken down into sequences of n characters which, depending upon the granularity desired and definitions used, could be raw bytes, assembly statements, source lexemes, lines, and so on. As n decreases towards 1, the significance of sequence information is reduced.

In addition to n-grams, other features have been used to generate heuristic classifiers. This collection of past research has demonstrated promising abilities for automatically generating heuristic classifiers that can perform the binary classification decision of separating malicious programs from benign ones. However the record does not indicate how well these techniques would do at finer-grained classifications needed for specimen identification (i.e., naming). While some of these methods may perform accurate classification, there is a concern as to whether the methods will generalize if packed or encrypted versions of both malicious and benign programs are used in training or test data. A packer will compress valid executables into a compressed segment and a short segment containing standard unpacking code. Both benign and malicious executables will have similar unpacking codes, but will differ on the compressed portions. The compressed portions will have high entropy and, in fact, tend towards resembling random data. Any n-gram matches of bytes from such sections are likely to be accidental. Thus any comparisons or classification decisions made on the basis of n-gram matches are likely to be based primarily on matches to the decompressing segment, which will be common to both benign and malicious code, and will fail to properly distinguish the two classes

SUMMARY OF THE INVENTION

The invention is a method for
(a) finding commonalities or potentially derived portions of code,
(b) measuring the similarity between programs according to these found portions of code, and
(c) searching for matches against a database of programs, classifying a program based on an existing program classification scheme, or constructing program phylogenies based on either the identified derived portions of code, or on the similarity measures.

n-Perms.

The use of n-Perms is a novel method that can be employed in one embodiment of the feature extraction step. The inventors define a variation on n-grams called "n-perms." For any sequence of n characters that can be taken to be an n-gram, an n-perm represents every possible permutation of that sequence. Thus n-perms are identical to n-grams except that the order of characters within the n-perm is irrelevant for matching purposes.

An object of the invention is to have feature extraction and similarity comparison function that accounts for minor variations due to sequencing, compiler, or maintenance differences.

An additional object of the invention is to provide a similarity function that will assess similarities between programs whether those programs are in assembly, bytecode, or machine code forms.

An additional object of the invention is to provide a classification method for determining how to classify a given program into a classification scheme.

An additional object of the invention is to generate a phylogenic graph of the analyzed programs.

A feature of the invention is the particular program abstraction of using program opcode or opcode mnemonics as sequences to build abstract features over, and the specific weighting functions that are applied.

An additional feature of the invention is the application term frequency scaling techniques have to the scaling of permutation-based feature vectors.

These and other objects, advantages, and features of this invention will be apparent from the following description.

BRIEF DESCRIPTION OF THE DRAWINGS

FIG. 1 depicts a pair of sequences related by swap modifications.

FIG. 2 is a phylogeny model showing clustering tendency of packed executables.

FIG. 3 depicts the creation of a feature frequency matrix.

FIG. 4 shows the cross-reference between a phylogeny model and naming by an AV scanner.

FIG. 5 depicts a possible feature selection and extraction in accordance with one preferred embodiment of the invention.

DETAILED DESCRIPTION OF THE INVENTION

Reorderings of code might be a result of malware author changing the behavior and organization of the code, or they might be a result of metamorphic programs modifying their own code. One aim of the invention is provide methods that can reconstruct derivation relationships in the presence of such perturbations. Specifically, two feature extraction techniques are examined: n-grams and a newly introduced variation of n-grams which may appear in any permutation—we call these "n-perms." These techniques are useful because they can find matches of similar segments in programs, and with such matches it is possible to generate models of likely derivation relationships through the analysis of similarity scores.

Phylogenetic systematics is the study of how organisms relate and can be ordered; a phylogeny is the evolutionary history or relationships between organisms. Molecular phylogenetics takes the approach of studying organism relationships by inferring derivation relationships from the information contained in the organisms themselves. The goal has been described as to infer a process from the patterns that are presented.

Software, too, has its own analogous field to molecular phylogenetics in which software artifacts are examined and compared in an effort to reconstruct their evolution history. Creating phylogeny models of malware is a specialized area within this field. Generally speaking, the approach taken is to analyze programs or program components for commonalities and differences, and then from these to infer derivation relationships or other aspects of evolution. It is important to note that, in forensic malware analysis, a phylogeny model need not correspond to the "true" phylogeny in order to be useful. For instance, incidental similarities not related through code derivation may still be helpful in analysis. For this reason one should not conflate the terms "phylogeny" and "phylogeny model".

Whether by design or by accident, the prior malware comparison methods have taken approaches that reduce reliance on sequencing information. Methods to compare or align sequences and strings are important tools for molecular phylogenetics. Techniques such as suffix trees, edit distance models, and multiple alignment algorithms are staples for comparing genetic information. These sorts of techniques have been applied to benign computer programs as well, including program texts at the source level, machine level, and in-between. Commercial anti-virus (AV) scanners are also known to use some types of sequence matching in order to classify programs into fine-grained categories (Win32.Evol.A, Win32.Netsky.B, etc.). It is not believed they are substantially similar to suffix trees, edit distances, and the like. Although those methods are known in bioinformatics they appear not to be widely used for the purpose of classification or phylogeny model generation for malware.

On the one hand, sequence-based methods may work well for phylogeny model generation when sufficient numbers of sequences are preserved during evolution. Consider, for instance, the two worms named I-Worm.Lohack.{a,b} (the notation X.{y,z} is a shorthand for the sequence X.y,X.z) which we obtained from VX Heavens, the widely available malware collection. Both worms are 40,960 bytes long and differ on only some 700 bytes (less than 2%). While these two particular programs share large blocks of common bytes, it cannot be assumed that all related malware will. Nonetheless, if, in practice, related malware families maintain sufficient numbers of common sequences then phylogeny models generated based on the sequence commonalities may be satisfactory.

On the other hand, many sequence-based methods may not work well for malware if it has evolved through significant code shuffling and interleaving. Signature-based AV scanners have been known to identify malware by searching for particular sequences. This fact is likely to motivate malware authors to destroy easily identifiable sequences between releases so that they can avoid detection. The ability of AV scanners to detect these sequences is likely to have prompted the emergence of polymorphic and metamorphic malware. Some polymorphic and metamorphic malware—such as Win32.ZPerm and WM/Shuffle.A—permute their code during replication. Recognizing the self-constructed derivatives will be difficult if these permutations are not accounted for. It is reasonable to expect that permutation and reordering will continue to be one of the methods in the malware authors' toolbox.

A common technique in text processing is to use n-grams as features for search, comparison, and machine learning. An n-gram is simply a string of n characters occurring in sequence. In using n-grams for malware analysis, the programs are broken down into sequences of n characters which, depending upon the granularity desired and definitions used, could be raw bytes, assembly statements, source lexemes, lines, and so on. As n decreases towards 1, the significance of sequence information is reduced.

In addition to n-grams, other features have been used to generate heuristic classifiers. This collection of past research has demonstrated promising abilities for automatically generating heuristic classifiers that can perform the binary classification decision of separating malicious programs from benign ones. However the record does not indicate how well these techniques would do at finer-grained classifications needed for specimen identification (i.e., naming). While some of these methods may perform accurate classification, there is a concern as to whether the methods will generalize if packed or encrypted versions of both malicious and benign programs are used in training or test data. A packer will compress valid executables into a compressed segment and a short segment containing standard unpacking code. Both benign and malicious executables will have similar unpacking codes, but will differ on the compressed portions. The compressed portions will have high entropy and, in fact, tend towards resembling random data. Any n-gram matches of bytes from such sections are likely to be accidental. Thus any comparisons or classification decisions made on the basis of n-gram matches are likely to be based primarily on matches to the decompressing segment, which will be common to both benign and malicious code, and will fail to properly distinguish the two classes.

Approaches for generating phylogeny models can be differentiated according to (a) the way that program features are selected which includes the type of tokens, characters, or low-level features (e.g., bytes or opcodes) and feature extraction techniques (e.g., n-grams), (b) the feature comparison methods or measures employed, (c) the type or structure of the models generated, and (d) the algorithms used to generate the models. One class of approaches is based on similarity measures between pairs of programs. Those skilled in the art will be able to construct many variations on this scheme for phylogeny model generation; the present invention pertains to: what features are extracted; how similarity is calculated in the process of building the phylogeny model; and the particular algorithm used to build the model based on similarity measures.

A general approach for searching for matching programs to compute pair-wise similarity between a "query" program and some selection of programs from a collection of programs to match against. Common variations on this scheme are to pre-process the collection to extract the match information first, such as extracting a table of feature frequencies for the programs in the collection, that is, to extract a matrix of feature frequencies. Another common variation is to pre-process the collection to scale or weight the matrix entries first before matching. Those skilled in the art will be able to construct many variations on this scheme for searching; the present invention pertains to: what features are extracted; and how similarity is calculated in the process measuring pair-wise similarity.

A general approach for classifying programs is to build a collection of existing programs and assign classifications to them, and then base the classification decision on pair-wise similarity scores calculated between the collection and a given program that one wishes to classify. A variation on this scheme is to pre-process the collection to extract and compute partial similarity information, such as the extraction of "signatures" or "fingerprints" for each program. An example is the collection of signatures for known viruses and then classifying a given program as a virus if its signature matches the signature of any virus in the collection. A feature frequency vector, for instance, can be considered a type of signature. Another variation is to use a hierarchical classification scheme for the program collection, such as a phylogenic model. The classification decision could be based on which program from the collection the given program matches best. Or it could be based on multiple measures of similarity. Those skilled in the art will be able to construct many variations on this scheme for classification; the present invention pertains to: what features are extracted and how similarity is calculated in the process of matching pairs of programs.

A focus of one preferred embodiment of the instant invention is on generating phylogeny models for malware that may have evolved, in part, through permutations of code. These permutations could include instruction reordering, block reordering, or subroutine reordering. In such situations the reordering can make sequence-sensitive techniques produce undesirable results if they report similarity scores that are too low for reordered variants or descendants.

For instance, consider the two programs P1 and P2 of FIG. 1, in which P2 is derived from P1 by swap edits. In the figure, distinct letters signify distinct characters from whatever alphabet is being used. P2 differs from P1 by a block swap (1-4 swap 9-12) and by two character swaps (2 swap 3 and 9 swap 10 on P1). The block swaps are highlighted using underlines and the character swaps using overlines. If each of these characters is a source line, the standard diff tool from the GNU Text Utils package finds only the efgh substring in common. This is because its differencing algorithm is based on LCS and an edit model that does not consider block moves or swaps.

One can consider two different feature types—n-grams, and n-perms—as bases for comparing programs for the purpose of building phylogeny models. Both of them permit permuted sequence matching based on document comparison techniques employing feature occurrence vector similarity measures. Such techniques match common features regardless of their positions within the original documents. From the similarity scores evolutionary relations can be inferred.

n-grams n-grams, already been introduced above, are widely used in a variety of applications. With bigrams (n=2), the two programs from FIG. 1 have four features in common covering six of 12 characters. Thus several matches occur which may be meaningful for evolution reconstruction. n-grams might be suboptimal for matching permuted sequences in cases where n does not correspond to the size of the important sequential features. For instance, for n=4 the only feature in common between P1 and P2 is the string efgh, meaning the two permuted subsequences are missed.

Another shortcoming of n-grams could potentially be encountered when n is too small to account for the significance of large sequences. For instance, consider a case when the sequence aaaaaaabbbbbbbb is an extraordinarily rare sequence shared by two programs, but the bigrams aa, bb and ab are frequent, and match multiple times. With bigrams, the significance of the rare but shared sequence may be lost. Small n-grams may also find misleading matches between unrelated programs simply because the likelihood of an incidental match is expected to increase as n decreases toward 1. However, there is a computational advantage to selecting small values of n since as n grows the numbers of potential features grows rapidly. For this reason many applications of n-grams choose either bigrams or trigrams (n=3), or apply various feature pruning heuristics.

n-perms

The inventors define a variation on n-grams called "n-perms." For any sequence of n characters that can be taken to be an n-gram, an n-perm represents every possible permutation of that sequence. Thus n-perms are identical to n-grams except that the order of characters within the n-perm are irrelevant for matching purposes. For example, in abcab there are three 3-grams, abc, bca and cab each with one occurrence. However it has only one 3-perm: abc, with three occurrences. The key idea behind n-perms is that they add another level of sequence invariance to the feature vector approach. If applied to P1 and P2 of FIG. 1, each of the three permuted blocks are matched with 4-perms, covering the full string; only one 4-gram matches, covering just four of 12 characters. With 2-perms there are six matches covering 10 of 12 characters, whereas 2-grams generate only four matches, covering six of 12 characters.

n-perms will be more tolerant of character-level reorderings (i.e., within a span less than n) than n-grams. In addition, for a given string, the number of possible features is expected to be less for n-perms than for n-grams since some of the sequences distinguished by n-grams will compare as indistinct for n-perms. These differences between n-perms and n-grams may prove advantageous in terms of reducing the number of features that need to be considered, and in terms of increasing match quality for permuted code.

n-perms may also be more "noisy" for a given n than n-grams because unrelated permutations may match. The noise might be controlled by choosing larger values of n, however block moves of smaller sizes may no longer be caught (no 5-perms match for P1 and P2 of FIG. 1, for example), and the number of features can be expected to rise. As with n-grams, the inventors expect the optimal selection of n may be dependent on the input. In the most general case, no single value of n will catch all permuted commonalities since they may occur at multiple granularities.

Calculation of Similarity Between Pairs of Programs.

A general scheme for calculating these is to tokenize the programs, extract features, collect vectors of feature frequencies for each program, and then measure the similarity of the resulting feature frequency vectors. The tokenization may involve disassembling the program, or extracting ASCII strings from it. (See FIG. 3)

One embodiment of the invention is to use abstracted assembly as the tokens to use for feature extraction. Any method of disassembly can be used, and those skilled in the art will be able to construct disassemblies of binaries or bytecodes. Two preferred implementations are to: use the opcodes so-extracted directly; and to use mnemonic representations of the opcodes. Other possible tokens include simple bytes or ASCII strings. (See FIG. 5).

One embodiment of the invention is to use log-scaled TFxIDF feature frequency vector scaling in combination with cosine similarity. A preferred embodiment uses some combination of opcodes or mnemonics, possibly with a conjunction with bytes or ASCII strings.

Description of other preferred embodiment corresponding to claims—i.e., n-perms with anything; n-perms with bytes, strings, opcodes, or mnemonics; either of those two with TFxIDF/cosine similarity.

Phylogeny Generation Using Vector Similarity

Both n-grams and n-perms can be used as features to match on, and can be utilized to create similarity measures based on vectors of feature occurrences. These vectors, which may be weighted or scaled, are taken to represent the programs, one vector per program. Such feature vector-based methods do not match based on the locations of the features within the programs, and so can detect permutations as being close matches.

In order to compare the relative merits of the extraction methods, the inventors implemented families of phylogeny model generators based on these techniques. There are many ways known in the art for constructing distance or similarity measures for these feature vectors, and each could be potentially applied to any of the these extraction methods. There are also a number of different heuristics that could be tried for pruning the input space.

The operational flow diagram shown below depicts implementation of a method of clustering computer programs in accordance with the principles of invention.

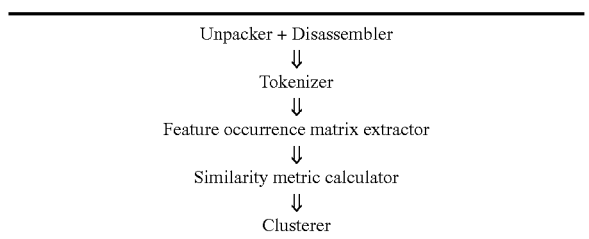

A second related implementation is when a search procedure is used instead of a clusterer, allowing for searching using the similarity measures. A third related implementation is when a classifier is used instead of a clusterer, allowing for classification of programs according to some criterion. For example, the classifier could classify a supplied program as malicious or benign based on whether it matches a list of known malicious programs to a given tolerance. Supplying the appropriate tokenizer allows different alphabets to be used, including bytes, words, lines, etc.

To use opcode sequences the programs need to be disassembled using any available disassembler. In a preferred embodiment one will want to use unpacked code since many malicious programs are intentionally packed to make them hard to analyze. FIG. 2 illustrates the point of using specimens with root name of "Bagle" and "Skudex" from the VX Heavens collection, which shows results using both unpacked versions and versions packed by the inventors. The figure was created using bigrams over bytes. The packed versions were created using one of the UPX packer or the Petite^1 packer. The packed versions have a "-upx" or "-petite" suffix to distinguish them. The packed versions all either cluster together or are in subtrees completely different from their unpacked versions. Moreover, many of the packed samples are arranged according to the packer type, suggesting that the clustering for the packed versions is based primarily on the unpacker segment. To illustrate this point, the similarity of the two Petite-packed Bagles was measured at 0.475, while the average similarity of the four packed Bagles as a whole was only 0.081:

While FIG. 2 was created using byte bigrams to illustrate a point, in the studies reported below only the opcode sequences were used as input. It was frequently found that both bytes and opcode sequences produced similar looking trees, but a closer investigation revealed that bytes were less reliable for this purpose.

Tokenizer.

In one preferred embodiment the invention uses a filter that transforms input programs into sequences of assembly opcodes, or tokens, which then can be fed as input to the feature extractor. This filter was implemented after observing that many members within a family of worms would vary according to data offsets or data strings, or by inclusion of junk bytes. The preference was to select features which were closely related to program behavior, yet were relatively immune to minor changes in offset or data. Transforming the input to abstracted assembly also helpfully reduced the size of the input considerably, making the similarity computations and clustering substantially easier and thus less expensive.

Feature Occurrence Matrix Extractor.

The invention includes two programs—one each for n-grams and n-perms—which take n as a parameter, extract features, and then construct a feature occurrence count matrix such that each entry i, j records the number of times feature i occurs in program j.

Similarity Metric Calculator.

This calculator takes as input a feature occurrence matrix and constructs a symmetric similarity matrix in which entry i, j records the calculated similarity between programs i and j. In a preferred embodiment, the similarity metric implements TFxIDF weighted cosine similarity, a combination that shall be referred to as TFxIDF/cosine. TFxIDF weights the features such that features common to many programs are scaled down in importance, and features common within any given program are scaled up in importance. The weighted matrix is constructed by calculating $tf_{i,j} \log(N/df_i)$, where $tf_{ij}$ is the count of the number of times feature i occurs in the jth program, and $df_i$ is the count of the number of programs in which feature i occurs.

Clusterer. In a preferred embodiment the invention uses agglomerative clustering functionality to build dendograms, and uses the UPGMA clustering criterion function, which is commonly used in biological phylogeny model generation. Although the resulting phylogeny models cannot capture multiple inheritances, the technique is well-known technique.

A clustering algorithm can be applied to create a phylogeny tree from the resulting matrix. It is believed that any clustering algorithm could be used, such as simple agglomerative clustering or others known to those in the art. When no clustering is employed, the methods described herein will result in the generation of program similarity or overlap scores. When a clustering method is used, the combination generates phylogenies.

It should be noted that by using any given feature-based phylogeny it is possible to convert the phylogeny into a decision tree by labeling the child arcs with the features that differentiate the child subtrees. Such a decision tree could be used for fast classification by starting at the root and searching for differentiating samples indicated.

The invention defines a modification of the TFxIDF weighting applied to terms as a standard technique in information retrieval. The modification is that instead of ordinary keywords as terms we are using n-perms or n-grams over abstracted assembly as terms.

Phylogeny Algorithm

There are three major approaches to build biological phylogeny: distance based methods, maximum likelihood methods and maximum parsimony method.

In distance based methods one tries to estimate the number of substitutions that have occurred by applying a specific evolutionary model. When all the pair-wise distances have been computed for a set of sequences, a tree topology can be inferred by a variety of methods. Main distance based methods include cluster analysis (UPGMA) and minimum evolution (neighbor joining).

A preferred embodiment of the invention uses a conventional clustering algorithm to build a phylogeny.

There are of course other alternate embodiments which are obvious from the foregoing descriptions of the invention, which are intended to be included within the scope of the invention, as defined by the following claims.

The invention claimed is:

1. A method for extracting features from programs comprising:
   (1) providing a processor and a receiving device;
   (2) receiving a pair of programs in said processor from said receiving device;
   (3) using said processor to extract one or more tokens from each said program; and
   (4) using said processor to extract one or more features for each said program based on said extracted tokens, wherein said extracted features are constructed so that two sequences of successive n tokens are considered the same feature if they are permutations of the same n tokens; using said processor to declare as the closest match between said unknown program and one or more of said collection programs the pairing of programs that yields the highest similarity score; and using said processor to classify said unknown program in the same class as the program that was the said closest match; and using said processor to generate a graph using said similarity score, said graph comprising a phylogeny tree.

2. The method in claim 1, further comprising using said processor to construct feature frequency vectors for each said program based on the extracted features.

3. The method in claim 2 further comprising calculating a similarity score for said pair of said programs by applying a similarity function to the feature frequency vectors extracted for each said program.

4. The method in claim 3 wherein said similarity function is TFxIDF/cosine.

5. A method for searching for matches to an unknown program against a collection of programs, said searching for matches being performed by comparing said unknown program against one or more programs in said collection of programs; said comparison comprising the following steps:
   (1) providing a processor and a receiving device;
   (2) receiving said unknown program and said one or more programs from said collection of programs in said processor from said receiving device;
   (3) using said processor to extract one or more tokens from said unknown program and said programs in said collection of programs;
   (4) using said processor to extract one or more features for each said program based on said extracted tokens, wherein said extracted features are constructed so that two sequences of successive n tokens are considered the same feature if they are permutations of the same n tokens;
   (5) using said processor to construct feature frequency vectors for each said program based on the extracted features;
   (6) using said processor to calculate a similarity score for the pairing of said unknown program with each said program in said collection of programs by applying a similarity function to the feature frequency vectors extracted for each said program; and
   (7) using said processor to declare a match between said unknown program and one or more of said programs in said collection of programs if said similarity score is at least a given minimum stated score.

6. The method in claim 5, wherein said similarity function is TFxIDF/cosine.

7. A method for classifying an unknown program based on a collection of programs that have been partitioned into classes of programs, said method comprising:
   (1) providing a processor and a receiving device;
   (2) receiving said unknown program and said collection of programs in said processor from said receiving device;
   (3) using said processor to extract one or more tokens from said unknown program and said programs in said collection of programs;
   (4) using said processor to extract one or more features for each said program based on said extracted tokens, wherein said extracted features are constructed so that two sequences of successive n tokens are considered the same feature if they are permutations of the same n tokens;
   (5) using said processor to construct feature frequency vectors for each said program based on the extracted features;
   (6) using said processor to calculate a similarity score for the pairing of said unknown program with each said program in said collection of programs by applying a similarity function to the feature frequency vectors extracted for each said program;
   (7) using said processor to declare as the closest match between said unknown program and one or more of said collection programs the pairing of programs that yields the highest similarity score; and
   (8) using said processor to classify said unknown program in the same class as the program that was the said closest match.

8. The method in claim 7, wherein said similarity function is TFxIDF/cosine.

9. A method for partitioning a collection of programs, said method comprising:
   (1) calculating the pair-wise similarity of all said programs within said collection of programs by the following method:
      (a) providing a processor and a receiving device;
      (b) receiving said collection of programs in said processor from said receiving device;

(c) using said processor to extract one or more tokens from each said program;
(d) using said processor to extract one or more features for each said program based on said extracted tokens, wherein said extracted features are constructed so that two sequences of successive n tokens are considered the same feature if they are permutations of the same n tokens;
(e) using said processor to construct feature frequency vectors for each said program based on the extracted features; and
(f) using said processor to calculate a similarity score for said pair of said programs by applying a similarity function to the feature frequency vectors extracted for each said program; and
(2) within said processor, using said pair-wise similarity scores as a basis for partitioning said programs in said collection of programs into classes of programs.

10. The method in claim 9, wherein said similarity function is TFxIDF/cosine.

11. The method in claim 9, wherein hierarchical agglomerative clustering is used as the basis for constructing said classes.

12. A method for building a phylogeny tree for categorizing software programs, said method comprising:
(1) providing a processor and a receiving device;
(2) receiving said software programs to be categorized in said processor from said receiving device;
(3) using said processor to extract features of said programs, wherein said extracted features are constructed so that two sequences of successive n tokens are considered the same feature if they are permutations of the same n tokens;
(4) using said processor to compare extracted features of one of said program with the extracted features of at least one other of said programs to ascertain the degree of similarity of said extracted features of said programs, said similarity being expressed as a similarity score; and
(5) using said processor to generate a graph using said similarity score, said graph comprising a phylogeny tree; said extraction step is performed as a full disassembly, linear sweep extraction; and when said opcodes are extracted, parameters and prefixes are discarded.

13. The method in claim 12, wherein each said extracted feature represents every possible permutation of the particular sequence.

14. The method in claim 12, wherein said comparing of extracted features is performed using TFxIDF/cosine.

* * * * *